United States Patent [19]

Sakakibara et al.

[11] Patent Number: 5,188,080
[45] Date of Patent: Feb. 23, 1993

[54] KNOCKING CONTROL SYSTEM FOR INTERNAL COMBUSTION ENGINE

[75] Inventors: Koji Sakakibara, Hekinan; Koichi Kamabora, Tokoname, both of Japan

[73] Assignee: Nippondenso Co., Ltd., Kariya, Japan

[21] Appl. No.: 825,382

[22] Filed: Jan. 24, 1992

[30] Foreign Application Priority Data

Jan. 25, 1991 [JP] Japan .................................. 3-007859

[51] Int. Cl.$^5$ ................................................ F02P 5/15
[52] U.S. Cl. .......................................... 123/425; 73/35
[58] Field of Search ...................... 123/425, 435; 73/35

[56] References Cited

U.S. PATENT DOCUMENTS

| | | | |
|---|---|---|---|
| 4,061,116 | 12/1977 | Saida et al. | 123/425 |
| 4,617,895 | 10/1986 | Sakakibara et al. | 123/425 |
| 4,711,212 | 12/1987 | Haraguchi et al. | 123/425 |
| 4,711,214 | 12/1987 | Sakakibara et al. | 123/425 |
| 4,993,387 | 2/1991 | Sakakibara et al. | 123/425 |

FOREIGN PATENT DOCUMENTS 1-315649 12/1989 Japan .

*Primary Examiner*—Andrew M. Dolinar
*Attorney, Agent, or Firm*—Cushman, Darby & Cushman

[57] ABSTRACT

A knocking control system for an internal combustion engine which is capable of surely detecting and reducing the knock of the engine. The knocking control system is equipped with a logarithmic conversion section for performing the logarithmic conversion of the effective knock intensity of the output signals of a knock sensor and a central value detecting section for detecting a central value in the logarithmic conversion value distribution. The deviation between the central value and the logarithmic conversion value is averaged to obtain an average value corresponding to the standard deviation of the logarithmic conversion value, thereby producing a knock decision level on the basis of the average value. The knock decision level is compared with the logarithmic conversion value so that the occurence of the knock is determined in accordance with the comparison result and the ignition timing of the engine is controlled in accordance with the determination result so as to reduce the knocking state.

7 Claims, 8 Drawing Sheets

KNOCKING CONTROL SYSTEM FOR INTERNAL COMBUSTION ENGINE

BACKGROUND OF THE INVENTION

The present invention relates to a knocking control system for controlling knock control factors such as ignition timing in accordance with a generation state of knocking in an internal combustion engine.

Conventionally, there is proposed a system in which a peak value of a knock signal outputted from a knock sensor is detected so as to produce a knock decision level on the basis of the logarithmic conversion distribution of the peak values to decide the occurrence of the knocking by comparing the peak value with the knock decision level. For example, according to the Japanese Patent Provisional Publication No. 1-315649, the central value (median) $V_M$ of the distribution of the substantial logarithmic conversion values V of the peak values is detected to determine a value S corresponding to the standard deviation of the conversion value V so that the probability of $V_M/S \leq V \leq V_M$ is ⅓ (33%). Further, the knock decision level $V_{KD}$ is produced in accordance with $V_{KD} = S^3 \times V_M$ so as to decide the occurrence of the knocking by comparison between the conversion value V and the knock decision level $V_{KD}$ to control the ignition timing in accordance with the decision result.

However, as illustrated in FIG. 1, the distribution configuration of the conversion value V varies in accordance with the degree of the knocking (i.e., small knocking, middle knocking and great knocking) such that the turning point of the distribution configuration is directed to a smaller cumulative probability point as the knocking becomes greater. In addition, since the inclination of the distribution configuration is smaller in the range above the turning point, in the case that the knocking is great so that the turning point becomes below the central value $V_M$, the value S corresponding to the standard deviation rapidly becomes large. That is, in FIG. 1, the range of the conversion value V corresponding to the cumulation 33 (%) below the central value VM in the case that the degree of the knocking is large (the range indicated by character a) considerably becomes wider as compared with the case that the degree of the knocking is middle (the range indicated by character b). This range ($V_M - V_M/S$) can be represented as $V_M \cdot (1 - 1/S)$ and hence varies in accordance with the value S in the case that the central value $V_M$ does not vary greatly. Thus, it is considered as the value S is considerably great when the degree of the knocking is great so that the range becomes wide. In the case that the degree of the knocking is great to increase the value S, the knock decision level determined by $S^3 \times V_M$ also becomes high, whereby as illustrated in FIG. 2 the knock decision probability scarcely varies as compared with the case that the degree of the knocking is middle, thereby producing the result that, irrespective of the degree of the knocking being great, the retardation control is substantially effected only by the amount taken when the degree of the knocking is middle. Accordingly, the conventional knocking control system provides a problem that, in cases where the degree of the knocking is great so that the turning point in the distribution is below 50% (in the case of heavy knocking), the control to the retardation side becomes insufficient so as not to surely reduce the knocking to thereby provide the possibility that the engine is damaged.

SUMMARY OF THE INVENTION

It is therefore an object of the present invention to provide a knocking control system which is capable of surely detecting the occurrence of the knocking irrespective of the case of the great knocking and controlling the ignition timing so as to reduce the knocking.

A feature of the present invention is that a value corresponding to the standard deviation in the logarithmic conversion distribution of the magnitudes of knocks detected by a knock intensity detecting means is detected by a standard deviation detecting means to control a knock control factor such as ignition timing so that the detected value becomes below a predetermined value, thereby controlling the knock control factor such as the ignition timing so that the standard deviation becomes below a predetermined value. Since the ignition timing is controlled on the basis of the value corresponding to the standard deviation over a wide range of the knocking state, the knock control can be effected in accordance with the knocking state even if the degree of the knocking is great. Thus, it is possible to surely reduce the knock irrespective of the great knocking, thereby preventing the damage of the engine.

In accordance with the present invention, there is provided a knocking control system for an internal combustion engine, comprising: a knock sensor for outputting signals in correspondence with intensities of knocks generated in the engine; knock intensity detecting means for detecting a signal of the output signals of the knock sensor which is indicative of the intensity of the knock generated in a predetermined interval of a combustion cycle of the engine; logarithmic conversion means for performing a logarithmic conversion of the knock intensity signal detected by the knock intensity detecting means; central value determining means for determining a central value in a distribution of the logarithmic conversion values obtained by the logarithmic conversion means; suppression amount determining means for determining, on the basis of a standard deviation of the logarithmic conversion value distribution, a suppression amount which is used for suppressing a knock decision level which is used for deciding whether the engine is in a knocking state; knock decision level determining means for determining the knock decision level on the basis of a deviation between the central value of the logarithmic conversion values and the suppression amount; decision means for comparing the knock decision level with the logarithmic conversion means to decide whether the knock occurs or not; and adjusting means for adjusting an operation state of the engine in accordance with the decision result of the decision means so as to reduce the knocking state.

Preferably, the suppression amount determining means includes: average value calculating means for averaging the deviations between the central value and the respective logarithmic conversion values to calculate an average value corresponding to a standard deviation of the logarithmic conversion value; and suppression amount calculating means for calculating the suppression amount on the basis of the average value calculated by the average value calculating means, or the suppression amount determining means includes: first calculating means for calculating the number of the logarithmic conversion values which are higher than a first level higher by a first predetermined value than the central value; second calculating means for calculating the number of the logarithmic conversion values which are lower than a second level lower by a second predetermined value than the central value; and suppression amount calculating means for calculating the suppression amount on the basis of a value corresponding to a standard deviation of the logarithmic conversion value which is determined in accordance with a total value of the number calculated by the first calculating means and the number calculated by the second calculating means. It is also preferable that the suppression amount determining means includes means for calculating the suppression amount on the basis of the number of the logarithmic conversion values which are out of the standard deviation of the logarithmic conversion value.

In addition, according to the present invention, there is provided a knocking control system for an internal combustion engine, comprising: a knock sensor for outputting signals in correspondence with intensities of knocks generated in the engine; knock intensity detecting means for detecting a signal of the output signals of the knock sensor which is indicative of the intensity of the knock generated in a predetermined interval of a combustion cycle of the engine; logarithmic conversion means for performing a logarithmic conversion of the knock intensity signal detected by the knock intensity detecting means; central value determining means for determining a central value in a distribution of the logarithmic conversion values obtained by the logarithmic conversion means; average value calculating means for calculating an average value corresponding to a deviation between the central value and the respective logarithmic conversion values; and adjusting means for adjusting an operation state of the engine in accordance with the average value calculated by the average value calculating means so as to reduce the knocking state.

BRIEF DESCRIPTION OF THE DRAWINGS

The object and features of the present invention will become more readily apparent from the following detailed description of the preferred embodiments taken in conjunction with the accompany drawings in which.

DETAILED DESCRIPTION OF THE INVENTION

Figure 1:
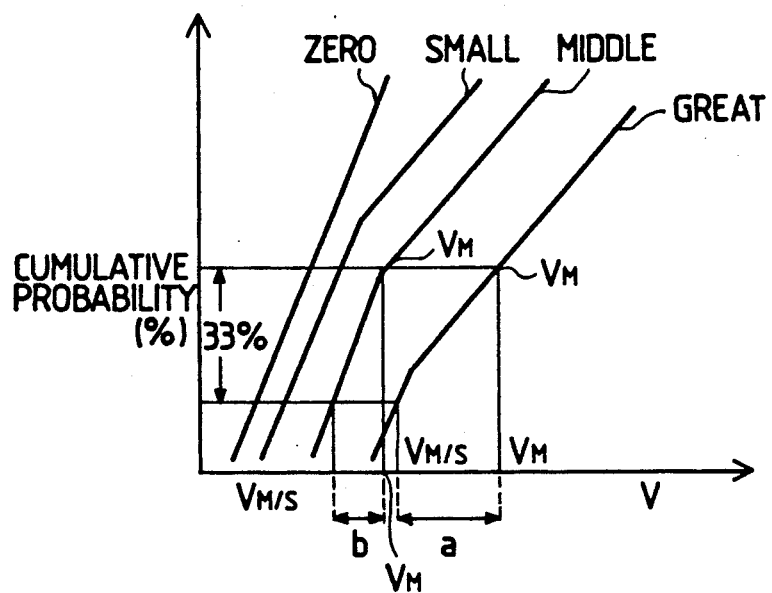
FIG. 1 is a graphic illustration of the relation between the knocking state and the cumulation probability.
Figure 2:
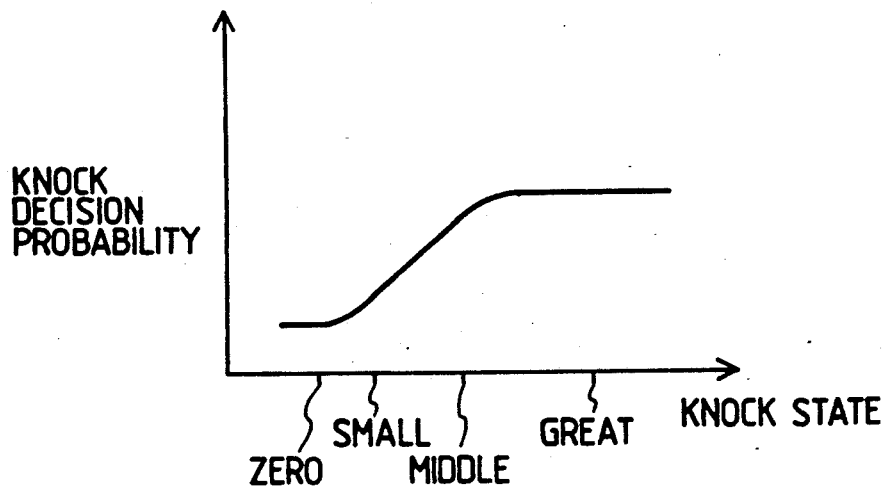
FIG. 2 is a characteristic illustration of the relation between the knock decision probability and the knocking state in a conventional technique.
Figure 3:
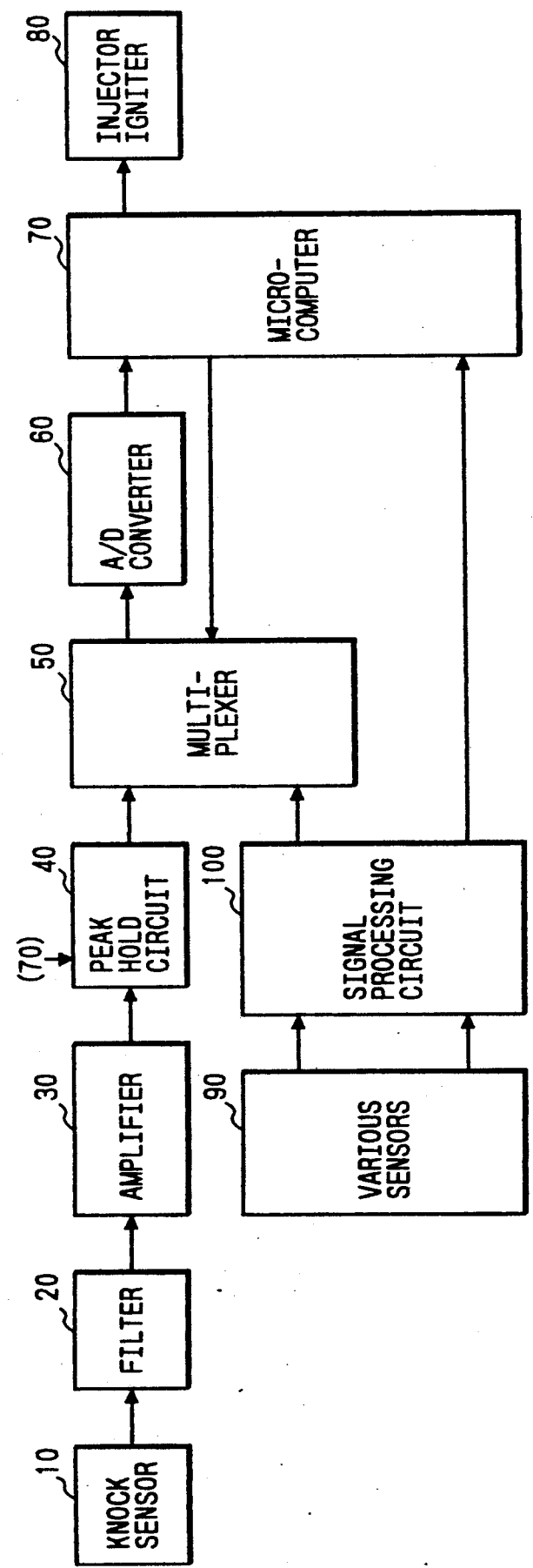
FIG. 3 is a block diagram showing the entire arrangement of a knocking control system according to the present invention.

Referring now to FIG. 3 there is illustrated the entire arrangement of a knocking control system according to an embodiment of the present invention. In FIG. 3, designated at numeral 10 is a knock sensor for detecting a knock generated in an engine of an automobile, not shown, and designated at numeral 20 is a filter for extracting a component relating only to the knock from the output signal of the knock sensor 10. Further, numeral 30 is an amplifier for amplifying the signal after passing though the filter 2, numeral 40 depicts a peak holding circuit for extracting a peak value of the output signal of the amplifier 30 and numeral 60 denotes an A/D converter for converting an analog signal into a digital signal. Between the peak holding circuit 40 and the A/D converter there is provided a multiplexer 50 which selects the input signal to the A/D converter. The output signal of the A/D converter 60 is supplied to a microcomputer 70, which is also coupled through a signal processing circuit 100 to various sensors such as a crank angle sensor, an intake air sensor and a water temperature sensor in order to calculate the ignition timing, a fuel injection amount and others on the basis of the detection signals of the various sensors 90. For realizing the calculation results, apparatus such as injector and igniter illustrated at numeral 80 are operated in accordance with the control signals outputted from the microcomputer 70.

Figure 4:
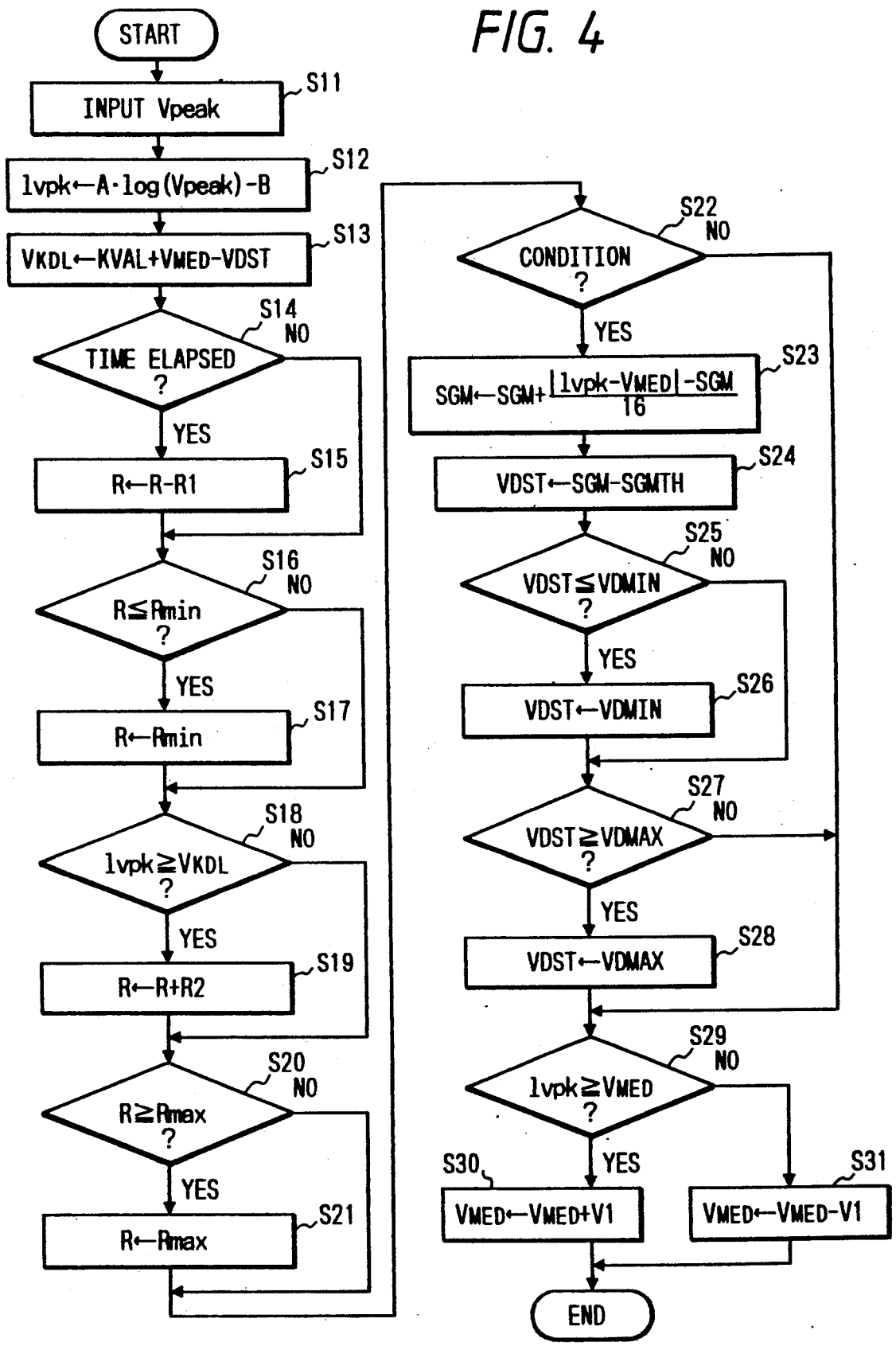
FIG. 4 is a flow chart for describing an operation according to a first embodiment of this invention.

FIG. 4 is a flow chart for deciding the occurrence of the knocking and further producing the knock decision level $V_{KDL}$, the flow chart being executed at every BTDC 30° CA (before top dead center 30° CA). In FIG. 4, a step S11 is first executed in order to input the A/D-converted peak hold value Vpeak of the knock sensor signal in a predetermined interval (for example, the interval between 10° to 90° CA after the top dead center). Subsequently, a step S12 is executed to calculate the logarithmic conversion value lvpk by performing the logarithmic conversion of the peak hold value Vpeak in accordance with the following equation:

$$lvpk = A \cdot \log(Vpeak) - B$$

where A and B are constants, for example, the constants A, B are respectively set to 64/log (4), 64.

A step 13 is for producing the knock decision level $V_{KDL}$ in accordance with the following equation:

$$V_{KDL} = KVAL + V_{MED} - VDST$$

where KVAL is a compatibility constant and set to about 32 to 64, $V_{MED}$ represents the central value in the lvpk distribution produced in steps S30 and S31 which will be described hereinafter, and VDST denotes a suppression value for suppressing the increase in the decision level on the basis of an average value SGM obtained in steps S24 and S25 which will be described hereinafter.

A step S14 follows to check whether a predetermined time period (for example, 1 second) is elapsed. If decision is made such that 1 second is elapsed after the previous 1 second elapse, a step S15 is executed to reduce the retardation amount R by R1 (for example, 0.5° CA), then followed by a step 16. On the other hand, if not elapsed, the operational flow directly advances to the step S16.

The operations from the step S16 to a step S21 are for a guard process and knock decision process for suppressing the retardation amount R into a predetermined range (the minimum guard value Rmin to the maximum guard value Rmax). In the step S16, it is checked whether the retardation amount R is below the minimum guard value Rmin (for example, 0). If so, a step S17 follows to set the retardation amount R to the minimum guard value Rmin, then followed by a step S18. If not below Rmin, the operational flow directly advances to the step S18. In the step S18 the knock decision is made by comparing the logarithmic conversion value lvpk with the knock decision level $V_{KDL}$. If the decision is made such that the knocking occurs, that is, when lvpk is above $V_{KDL}$, the operational flow proceeds to a step S19 to increase the retardation amount R by R2 (for example, 0.5° CA), then followed by a step S20. On the other hand, if the decision is made as no occurrence of the knocking, that is, when lvpk is blow $V_{KDL}$, the operational flow jumps the step S19 to advance to the step S20. In the step S20, it is checked whether the retardation amount R is above the maximum guard value Rmax (for example, 10° CA). If so, a step S21 follows to set the retardation amount to the maximum guard value Rmax, then followed by a step S22. On the other hand, if the retardation amount R is below Rmax, the operational flow directly advances to the step S22.

The step S22 is for checking a specific condition. Here, for instance, the specific condition is set when satisfying at least one of the following conditions:
1) the load is above a predetermined value;
2) the engine speed is in a predetermined range;
3) the rates of change of the engine speed and load are below predetermined values; and
4) the water temperature is in a predetermined range.

If the specific condition is satisfied in the step S22, the operational flow advances to a step S23 to calculate an average value SGM in accordance with the following equation.

$$SGM \leftarrow SGM + (|lvpk - V_{MED}| - SGM)/16$$

Here, this average value SGM is an average value of the distances ($|lvpk - V_{MED}|$) between the central value VMED and the respective data lvpk, and varies in accordance with the standard deviation $\sigma$ of the lvpk distribution.

Steps S24 to S28 are for calculating a suppresion amount VDST for suppressing the decision level VKDL, thereby performing the guard process. In the step S24, the suppression amount VDST is calculated by taking the difference between the average value SGM and a predetermined value SGMTH as indicated by the following equation.

$$VDST = SGM - SGMTH$$

Here, the predetermined value SGMTH is set to a value (for example, 20) which is slightly greater than the average value SGM1 predetermined through test in the case that the knocking does not occur. In the step S25 it is checked whether the suppression value VDST is below the minimum guard value VDMIN (for example, 0). If so, the step S26 follows to set the suppression value VDST to the minimum guard value VDMIN, then followed by the step S27. On the other hand, if not below VDMIN, the operational flow jumps the step 26 to directly advance to the step S27. The step S27 is for checking whether the suppression value VDST is above the maximum guard value VDMAX. If so, the step S28 follows to set the suppression value VDST to the maximum guard value VDMAX, then followed by a step S29. If the suppression value VDST is not above VDMAX, the operational flow jumps the step S28 to directly advance to the step S29. In the step S29, the logarithmic conversion value lvpk is compared with the central value $V_{MED}$. If lvpk is above $V_{MED}$, a step S30 is executed to add a predetermined value V1 (for example, which is 1, or which can be changed in accordance with the operating state or the rate of change of the knock sensor signal) to the previous $V_{MED}$ to update $V_{MED}$, thereafter terminating this routine.

On the other hand, if in the step S29 lvpk is smaller than $V_{MED}$, a step S31 is executed to subtract the value V1 from the previous $V_{MED}$ to update $V_{MED}$, thereafter terminating this routine.

Figure 5:
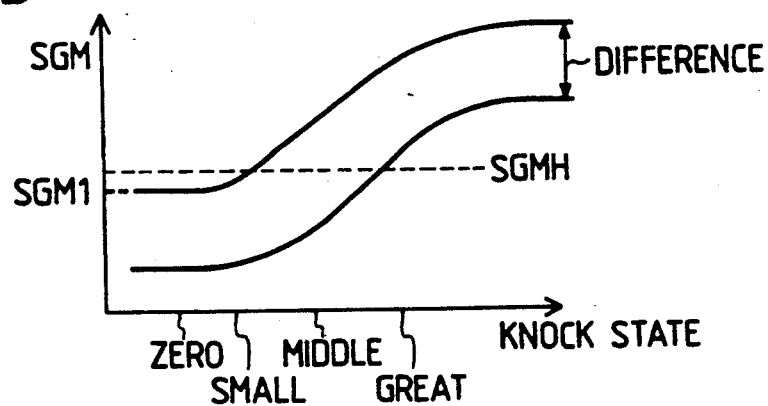
FIG. 5 is a graphic illustration of the relation between the average value SGM and the knocking state in the embodiment of this invention.
Figure 6:
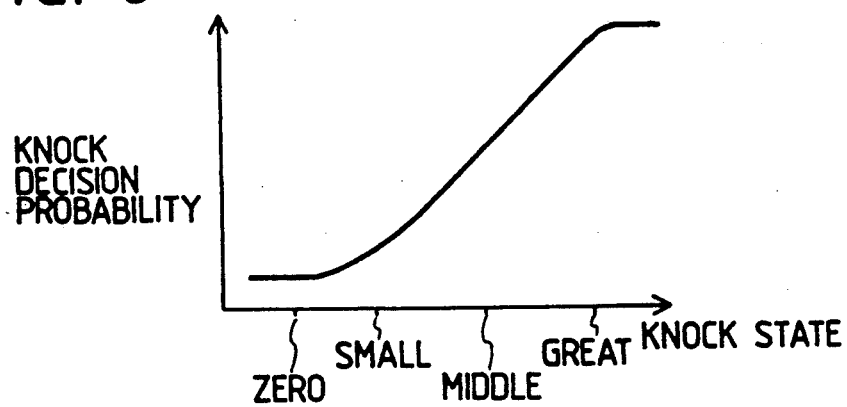
FIG. 6 is a graphic illustration of the relation between the knock decision probability and the knocking state in the embodiment of this invention.

A description will be made hereinbelow in terms of the above-mentioned average value SGM, knock decision level $V_{KDL}$ and knock decision probability. FIG. 5 shows the relation between the average value SGM (which will be referred hereinafter to as SGM) and the knocking state. As illustrated in FIG. 5, SGM becomes greater as the degree of the knocking becomes greater and takes a slightly different value when the engine is different, for example. Further, the knock decision level $V_{KDL}$ becomes lower as the suppression value VDST becomes greater as shown by the step S13 in FIG. 4 and the suppression value VDST becomes greater as SGM becomes greater as shown by the step S24 in FIG. 4. That is, the knock decision level $V_{KDL}$ can more be suppressed as SGM becomes greater (as the degree of the knocking becomes greater). Thus, as illustrated in FIG. 6, the knock decision probability becomes higher as the degree of the knocking becomes greater, and varies in accordance with the knocking state up to the great knocking state. Accordingly, when the degree of the knocking is great, the knock decision probability becomes higher as compared with the case that the degree of the knocking is small or middle, whereby the retardation amount is controlled to become larger so as to reduce the knock.

Figure 7:
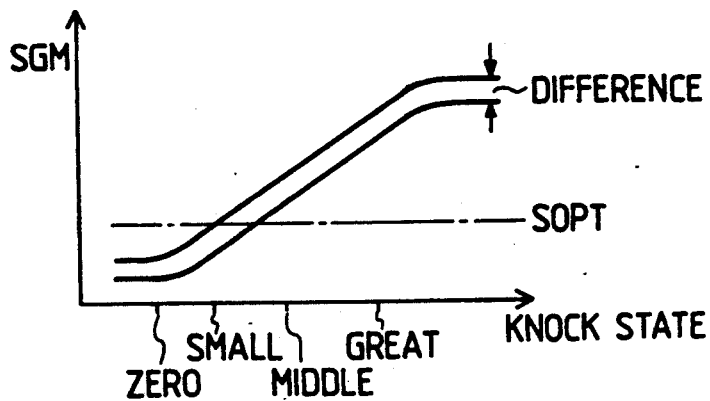
FIG. 7 illustrates the relation between the average value SGM and the knocking state in the case of using a cylinder internal-pressure sensor as the knock sensor.

Although in the above-described embodiment a vibration sensor is used as the knock sensor 10, it is appropriate to use a cylinder internal-pressure sensor in place of the vibration sensor. A description will be made hereinbelow in terms of another embodiment using the cylinder internal-pressure sensor. In the case of using the cylinder internal-pressure sensor, since it is possible to more accurately detect a signal corresponding to the degree of the knocking, the difference of SGM can be kept to be smaller as compared with the case of using the vibration sensor as illustrated in FIG. 7. Thus, in this case, it is also possible to use SGM to directly control the knock control factor, but not using SGM to suppress the decision level.

Figure 8:
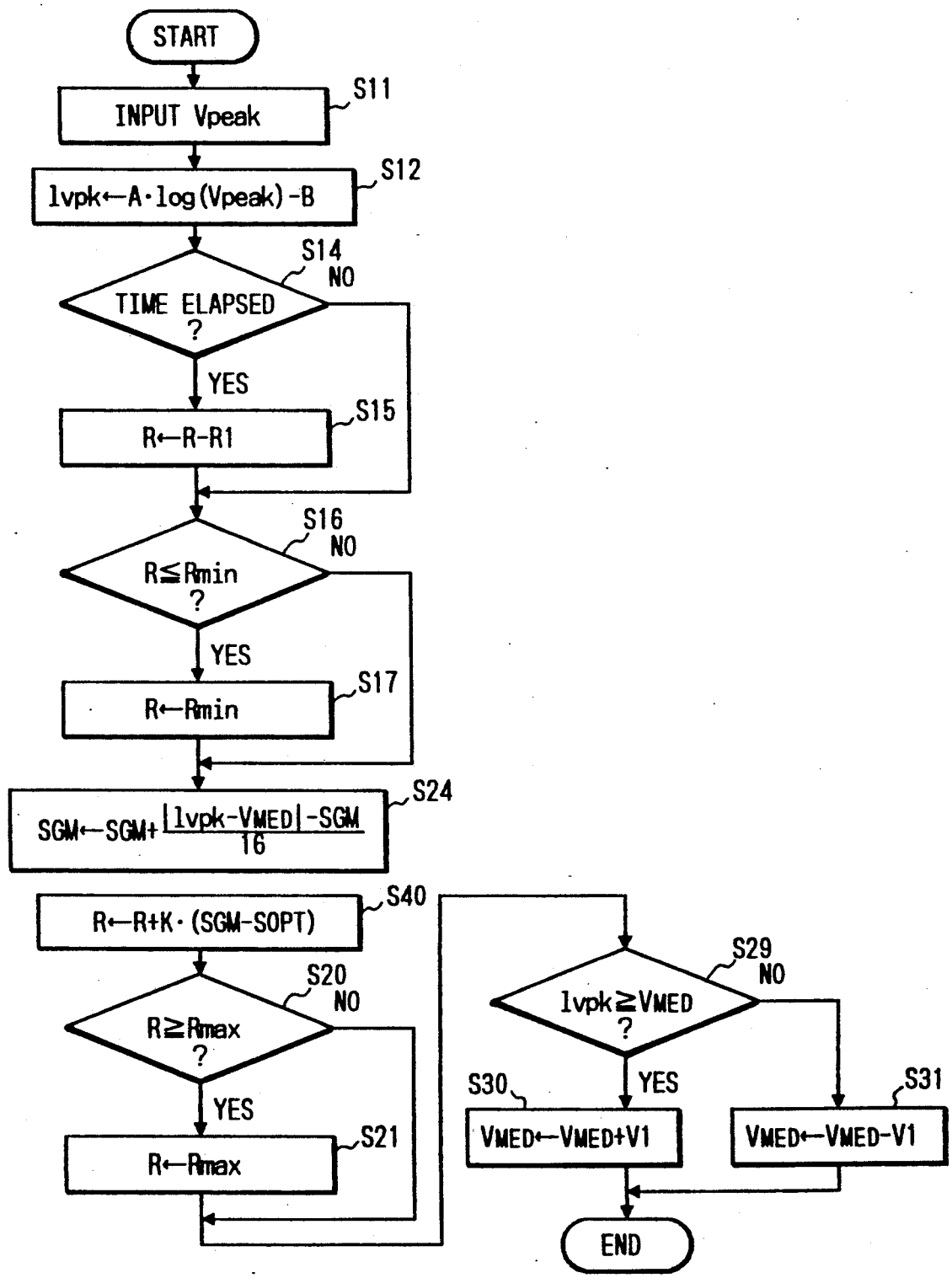
FIG. 8 is a flow chart for describing an operation of a second embodiment of this invention which uses the cylinder internal-pressure sensor as the knock sensor.

FIG. 8 is a flow chart showing operation in the case of use SGM to directly control the knock control factor, where processes corresponding to those in FIG. 4 are indicated by the same marks. In FIG. 8, steps S11, S12, S14 to S17 and S23 are similarly for the inputting process of the peak value Vpeak, logarithmic conversion process, guard process of the retardation amount R, advancing process at every a predetermined time and calculating process of the average value SGM. Thereafter, the operational flow goes to a step S40 to calculate the retardation amount R by adding to the previous retardation amount R a value obtained by multiplying a feedback gain K by the deviation between the average value SGM and a predetermined value SOPT as indicated by the following equation.

$$R \leftarrow R + K \cdot (SGM - SOPT)$$

Here, the predetermined value SOPT is a target value of SGM and, as shown in FIG. 7, is set to the SGM value obtained when the degree of the knocking is small and stored in the microcomputer 70 as a map corresponding to the engine speed. In response to the completion of the calculation of the retardation amount R, this routine is terminated after the guard process of the retardation amount R and the updating process of the central value $V_{MED}$ are executed in steps S20 to S21 and S29 to S31.

In this embodiment, the retardation amount R becomes greater as the deviation between SGM and SOPT becomes greater and becomes greater in accordance with the degree of the knocking even if the knocking is in the great state, and hence the knock decision probability becomes higher in accordance with the degree of the knocking over a wide range from a small knocking state to a great knocking state. Accordingly, it is possible to surely perform the retardation control in accordance with the knocking state even if the knocking is in the great state, thereby surely reducing the knock.

Figure 9:
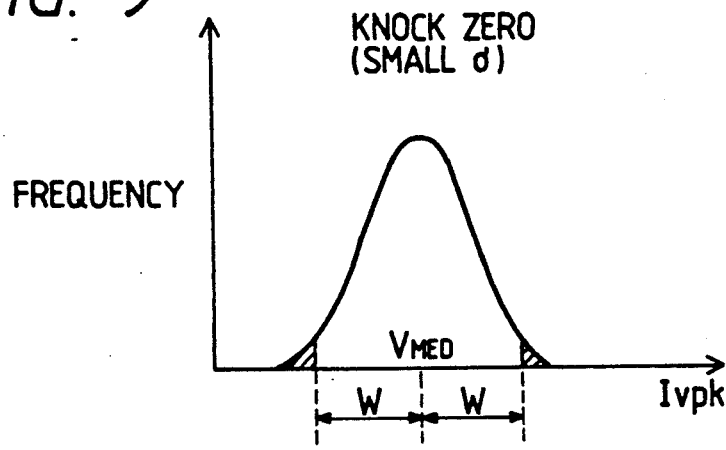
FIG. 9 is a distribution illustration of the peak value lvpk in the case of no occurrence of the knocking.
Figure 10:
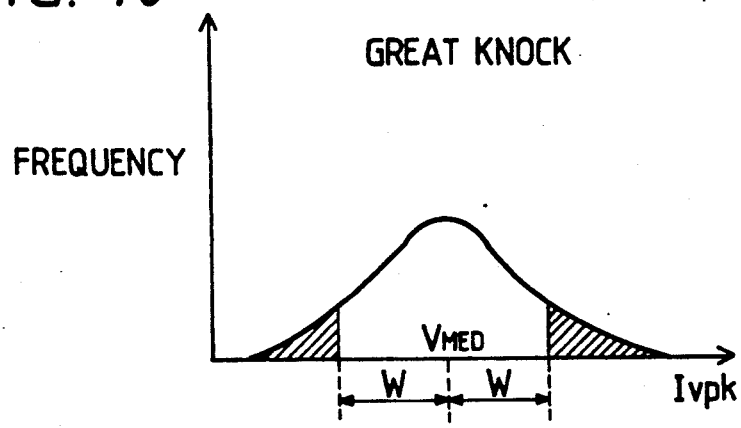
FIG. 10 is a distribution illustration of the peak value lvpk when the degree of the knocking is great.

Although in the FIG. 4 embodiment the suppression value VDST for suppressing the increase in the knock decision level $V_{KDL}$ is calculated on the basis of SGM corresponding to the standard deviation of the logarithmic conversion distribution of the peak values Vpeak, it is also appropriate to obtain it in accordance with the following method. FIGS. 9 and 10 are illustrations of the frequencies of lvpk in the case of no occurrence of the knocking and in the case that the degree of the knocking is great. These illustrations show that the number of the lvpk values which are out of the range of the central value VMED±W (W is a constant and is about 32) increases when the degree of the knocking is great, and this number corresponds to the standard deviation in the lvpk distribution. In the embodiment described hereinbelow, when the number of the lvpk values which are out of range of $V_{MED}\pm W$ is great, the suppression amount VDST is increased so as to surely perform the knock decision when the degree of the knocking is great. This embodiment will be described hereinbelow with reference to a flow chart of FIG. 11.

Figure 11:
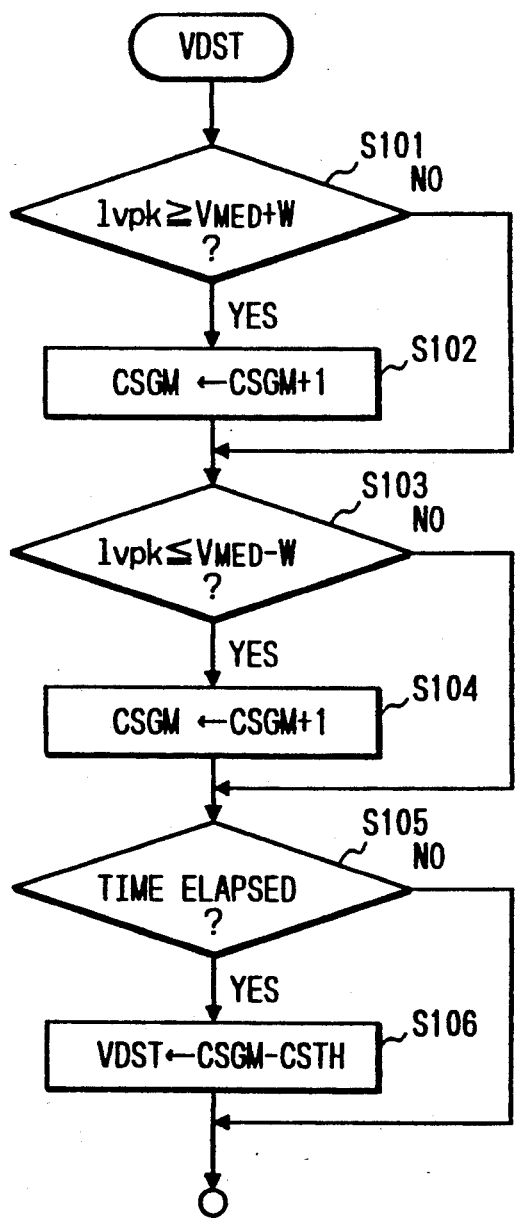
FIG. 11 is a flow chart for describing an operation for producing the suppression value VDST in the embodiment of this invention.

In FIG. 11, a step S101 is provided in order to check whether lvpk is equal to or greater than ($V_{MED}+W$). If "YES", the operational flow goes to a step S102 to increment a counter CSGM, then followed by a step S103. If the decision of the step S101 is "NO", the operational flow directly advances to the step S103. In the step S103, it is checked whether lvpk is below ($V_{MED}-W$). If "YES", a step S104 follows to increment the counter CSGM, then followed by a step S105. On the other hand, if the decision of the step S103 is "NO", the operation flow directly advances to the step S105. The step S105 is for checking whether a predetermined time period (for example, 20 ignitions) is elapsed. If so, a step S106 follows to set as the suppression value VDST a value obtained by subtracting a constant CSTH (for example, 4 to 8) from the counter CSGM value, thereafter terminating this routine. On the other hand, if the decision of the step S105 is "NO", this routine is terminated without executing the step S106.

Figure 12:
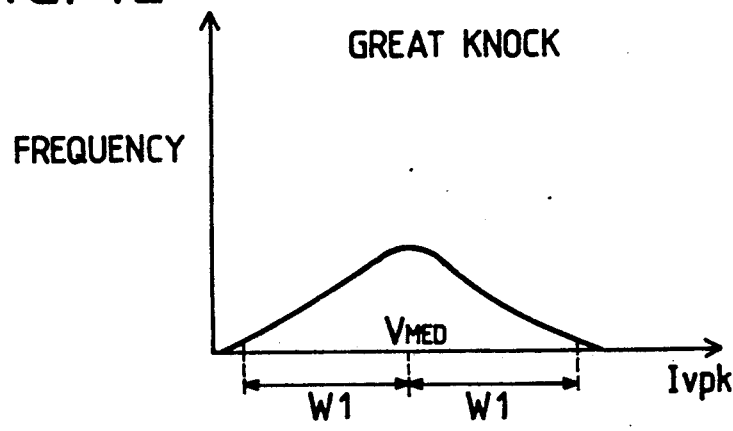
FIG. 12 is a distribution illustration of the peak value when the degree of the knocking is great.
Figure 13:
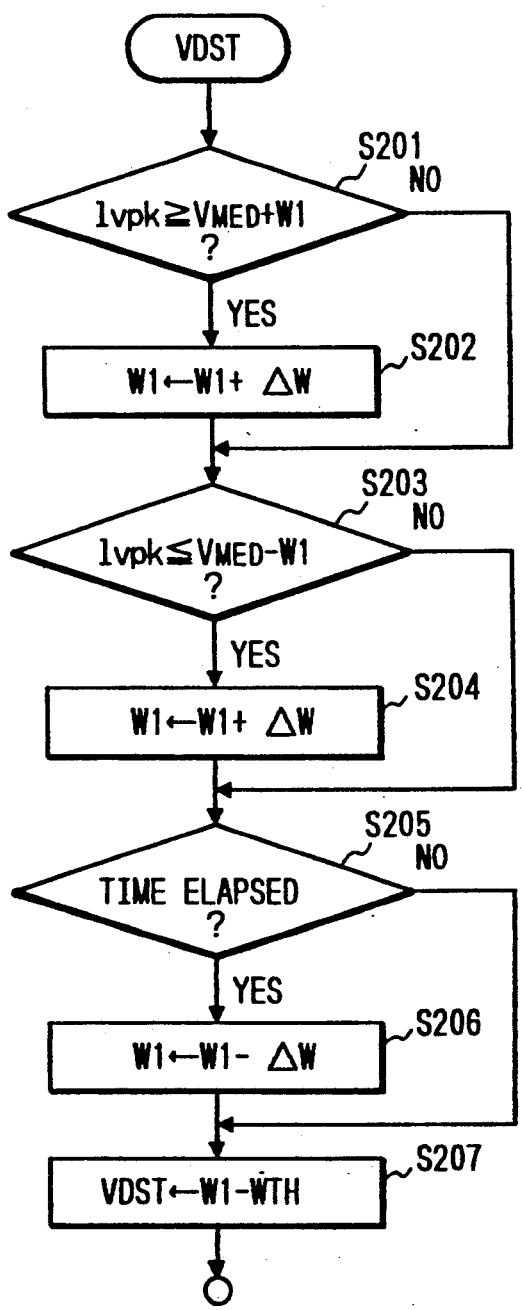
FIG. 13 is a flow chart for describing a different operation for producing the suppression value VDST.

Further, a description will be made in terms of a different production method of the suppression value VDST. As illustrated in FIG. 12, in the case that the control of a range W1 is effected so that the number of lvpk values which are out of the range of VMED±W1 becomes constant, W1 becomes wide when the degree of the knocking becomes great and takes a value corresponding to the standard deviation of the lvpk distribution. Operation for the production of the suppression value VDST based on W1 will be described hereinbelow with reference to a flow chart of FIG. 13. In FIG. 13, a step S210 is provided in order to check whether lvpk is equal to or greater than ($V_{MED}+W1$). If "YES", a step S202 follows to update W1 by adding $\Delta W$ (for example, 1) to W1, then followed by a step S203. If "NO" in the step 201, the operational flow directly goes to the step S203. In the step S203, it is checked whether lvpk is below ($V_{MED}-W1$). If "YES", a step S204 follows to update W1 by adding $\Delta W$ to W1, then followed by a step S205. If "NO" in the step S203, the operational flow directly advances to the step S205. The step S205 is for checking whether a predetermined time period (for example, 10 ignitions) is elapsed. If the predetermined time period is elapsed after the completion of the previous predetermined time period, a step S206 follows to update W1 by subtracting $\Delta W$ from W1, that is, W1 is subtracted by $\Delta W$ at every predetermined time period, thereafter advancing to a step S207. If the decision of the step S205 is no elapse of the predetermined time period, the operational flow directly advances to the step S207. The step S207 is for subtracting a constant WTH (for example, about 30 to 50) from W1 to set the obtained value as the suppression value VDST, thereafter terminating this routine. The above-described calculation routines (the steps S101 to S106 and S201 to S207) of the suppression value VDST correspond to the steps S23 and S24 in FIG. 4.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A knocking control system for an internal combustion engine, comprising:
   a knock sensor for outputting signals in correspondence with intensities of knocks generated in said engine;
   knock intensity detecting means for detecting a signal of the output signals of said knock sensor which is indicative of the intensity of the knock generated in a predetermined interval of a combustion cycle of said engine;
   logarithmic conversion means for performing a logarithmic conversion of the knock intensity signal detected by said knock intensity detecting means;

central value determining means for determining a central value in a distribution of the logarithmic conversion values obtained by said logarithmic conversion means;

suppression amount determining means for determining, on the basis of a standard deviation of the logarithmic conversion value distribution, a suppression amount which is used for suppressing a knock decision level which is used for deciding whether said engine is in a knocking state;

knock decision level determining means for determining said knock decision level on the basis of a deviation between the central value of said logarithmic conversion values and said suppression amount;

knock occurrence decision means for comparing said knock decision level with said logarithmic conversion means to decide whether the knock occurs or not; and adjusting means for adjusting an operation state of said engine in accordance which the decision result of said knock occurrence decision means so as to reduce the knocking state.

2. A system as claimed in claim 1, wherein said suppression amount determining means includes: average value calculating means for averaging the deviations between said central value and the respective logarithmic conversion values to calculate an average value corresponding to the standard deviation of said logarithmic conversion value; and suppression amount calculating means for calculating said suppression amount on the basis of said average value calculated by said average value calculating means.

3. A system as claimed in claim 1, wherein said suppression amount determining means includes; first calculating means for calculating the number of said logarithmic conversion values which are higher than a first level higher by a first predetermined value than said central value; second calculating means for calculating the number of said logarithmic conversion values which are lower than a second level lower by a second predetermined value than said central value; and suppression amount calculating means for calculating said suppression amount on the basis of a value corresponding to the standard deviation of said logarithmic conversion value which is determined in accordance with a total value of the number calculated by said first calculating means and the number calculated by said second calculating means.

4. A system as claimed in claim 1, wherein said suppression amount determining means includes means for calculating said suppression amount on the basis of the number of said logarithmic conversion values which are out of the standard deviation of said logarithmic conversion value.

5. A system as claimed in claim 1, wherein said adjusting means includes ignition timing control means for controlling a retardation amount of the ignition timing of said engine in accordance with the decision result of said decision means so as to reduce the knocking state.

6. A knocking control system for an internal combustion engine, comprising:

a knock sensor for outputting signals in correspondence with intensities of knocks generated in said engine;

knock intensity detecting means for detecting a signal of the output signals of said sensor which is indicative of the intensity of the knock generated in a predetermined interval of a combustion cycle of said engine;

logarithmic conversion means for performing a logarithmic conversion of the knock intensity signal detected by said knock intensity detecting means;

central value determining means for determining a central value in a distribution of the logarithmic conversion values obtained by said logarithmic conversion means;

average value calculating means for calculating an average value corresponding to a deviation between said central value and the respective logarithmic conversion values; and adjusting means for adjusting an operation state of said engine in accordance with the average value calculated by said average value calculating means so as to reduce the knocking state.

7. A system as claimed in claim 6, wherein said adjusting means includes ignition timing control means for controlling a retardation amount of the ignition timing of said engine in accordance with the decision result of said decision means so as to reduce the knocking state.

* * * * *